Patented Nov. 7, 1933

1,934,263

UNITED STATES PATENT OFFICE 1,934,263

REFRACTORY

Karl Hacks and William S. Sprow, Aliquippa, Pa.

No Drawing. Application May 25, 1933
Serial No. 672,868

8 Claims. (Cl. 75—87)

This invention relates to refractory linings for the interior of furnaces, such for example as those used for melting metal, glass and the like, and for heating metal, glass, other metals and articles. It is particularly applicable to forming the bottoms of open hearth and electric steel-melting furnaces, and will be described principally with reference to such applicability.

A major object of the invention is to provide a method of fusing a refractory lining on an interior surface of a furnace to the end that the furnace may be provided with linings of improved character, such as being of greater life or formed from much more refractory material, than those obtained according to the prevailing practice, and that the lining may be quickly and economically formed.

In the operation of open hearth steel furnaces, it is necessary to frequently reline their bottoms and their sides up to the level of the molten metal because such refractory linings as are now used are so attacked by the molten metal and slag that they customarily last but a few weeks. The usual linings, or "bottoms" as they are called, of basic open hearth furnaces are formed of granular magnesite mixed with a bonding agent or flux, these mixtures being spread upon the bottom of the heated furnace after the metal and slag has been tapped from it. The firing of the furnace is then continued until its high residual heat and that supplied by the firing fuse the mixture to the bottom, it usually requiring several hours to do this. It is largely because of the presence of the bonding or fluxing agent in the lining mixture that such linings are readily attacked and destroyed in whole or in part by the molten steel and slag. However, the refractories used, such as magnesite, have such high melting points that it has not been practicable heretofore to fuse them into bottoms without the use of a bonding agent or flux.

Our invention is predicated upon our discovery that a refractory lining may be quickly and satisfactorily fused upon an interior surface of a furnace by applying the heat of reaction evolved in oxidation of an easily oxidizable metal. For example, a highly refractory material, such as magnesite free from a bonding agent, may be satisfactorily and quickly fused to form a furnace lining by forming a mixture of the refractory in granular form and particles of a readily oxidizable metal, such as aluminum, and then oxidizing the metal of the mixture to supply heat for fusing the refractory. Advantageously the oxidation of the metal is effected by reaction with a reducible metallic oxide with which it will react with liberation of a large amount of heat. Such a reaction may itself supply refractory lining material, e. g., alumina formed in the oxidation of aluminum as the easily oxidizable metal. Most suitably, however, the lining mixture is composed of granular highly refractory material, a granular reducible oxide, and an oxidizable metal capable of reducing the reducible oxide.

In the practice of the invention as applied to forming a magnesite lining on the bottom of an open hearth furnace, granular magnesite may be mixed with aluminum and with a reducible metal oxide, such as oxides of iron, copper, chromium, and the like. By way of example, and without limitation, we have found that a mixture in the proportion of 8 pounds of magnesite to 3 pounds of iron oxide to 1 pound of aluminum quickly forms a fused magnesite lining on the bottom of a heated open hearth furnace. The mixture may be shoveled upon the bottom of a furnace in the usual manner, and within a short time, not more than a half an hour, the magnesite is satisfactorily fused.

In effecting this fusion of magnesite, the heat of the furnace causes the iron oxide to react with the aluminum which results in the evolution of a large amount of heat, which heat, together with that of the heated furnace, raises the temperature of the magnesite to its fusion point, i. e., about 3500° F., and thus provides a much higher temperature than obtainable by the firing of the furnace. The resulting fused magnesite contains alumina resulting from the oxidation of the aluminum by the iron oxide present in the mixture. However, the alumina rather than having the disadvantageous characteristics of the bonding or fluxing materials heretofore used in furnace linings is in itself a highly refractory material which does not lower the effective refractoriness of the magnesite.

The aluminum used in the furnace lining mixture is preferably of a size which passes through an 8 mesh and is retained upon a 25 mesh screen. However, in case the high temperature of a heated furnace is not available for starting reaction between the aluminum and the reducible metal oxide, some aluminum in finer or even in powdered form may be used in the mixture to start the reaction, or powdered magnesium may be used for this purpose. We have found that if the aluminum is all in powdered form the reaction starts at a much lower temperature and produces a lower final temperature as compared with granular aluminum. That may be undesirable where extremely high final temperatures are needed. In place of using aluminum as a readily oxidizable metal, other metallic agents may be used, such as magnesium or other suitable readily oxidizable metal. However, aluminum is preferable because with granulated aluminum the starting temperature is high, and therefore the temperature at the end of the reaction is high, producing satisfactory fusing. In place of including a reducible metal oxide in the mixture, oxidation of the aluminum may be effected by an oxidizing atmosphere, such as an oxidizing flame of a furnace or reducible oxide might be derived from residual slag remaining in the furnace after tapping.

The invention is not limited to the forming of fused magnesite linings, but is applicable to forming linings of other refractories such as bauxite, chromite, silica, mullite, spinel, and the like, as well as to mixtures of these and other highly refractory materials, the particular refractory material to be used depending upon the conditions of service. However, as far as concerns the lining of open hearth furnaces a magnesite lining formed according to our invention is so highly resistant that it may be used for both acid and basic processes, with substantial economies in their operations. For example, using a tilting furnace lined with magnesite in accordance with the invention there may be applied first the basic process for the removal of phosphorus and silicon. After removal of the basic slag there is built up a highly acid slag for final refinement of the heat. This permits the use of a single furnace with elimination of the disadvantages previously encountered in prior attempts to apply such procedures, in which the metal had to be transferred from one furnace to another upon changing slags because no lining was available which could be used satisfactorily with both types of slag. Such transfer adds to processing costs and is otherwise disadvantageous. Our linings, however, eliminate the need for the transfer step and make but a single furnace necessary.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. The method of fusing a refractory lining upon an interior surface of a furnace, comprising applying to the surface a layer formed of a mixture of granular refractory and particles of a readily oxidizable metal, and oxidizing the metal of such mixture to supply heat for fusing the refractory.

2. The method of forming a refractory lining upon an interior surface of a furnace, comprising applying to the surface a layer of a mixture including granular oxide and granular metallic reducing agent therefor, said mixture being adapted to form said refractory lining, and effecting reaction in said mixture and thereby liberating heat and forming the refractory lining.

3. The method of fusing a refractory lining upon an interior surface of a furnace, comprising applying to the surface a layer formed of a mixture of granular refractory, particles of a readily oxidizable metal and of a metal oxide reducible by said metal, and applying heat to said mixture to cause the oxidizable metal and said metal oxide to react and thereby evolve heat for fusing the refractory.

4. The method of fusing a refractory lining upon an interior surface of a furnace, comprising applying to the surface a layer formed of a mixture of granular refractory, aluminum and a reducible metal oxide, and applying heat to said mixture to cause the aluminum to react with said metal oxide and thereby evolve heat for fusing the refractory.

5. The method of forming a refractory lining upon an interior surface of a furnace, comprising applying to the surface a layer of a granular mixture of highly refractory oxide material, reducible oxide, and metal capable of reducing said reducible oxide with liberation of a large amount of heat, and effecting reaction between said metal and reducible oxide and thereby fusing said refractory oxide to form said lining.

6. The method of fusing a refractory lining upon an interior surface of a heated furnace, comprising applying to the surface a layer formed of a mixture of granular refractory and particles of granulated aluminum, and heating the mixture in an oxidizing atmosphere to cause oxidation of said aluminum and thereby supply heat for fusing the refractory.

7. The method of fusing a refractory lining upon an interior surface of a heated furnace, comprising applying to the surface a layer formed of a mixture of granular refractory and particles of a readily oxidizable metal, and heating the mixture in an oxidizing atmosphere to cause oxidation of said metal and thereby supply heat for fusing the refractory.

8. The method of fusing a refractory lining upon an interior surface of a heated furnace, comprising applying to the surface a layer formed of a mixture of granular refractory, particles of a readily oxidizable metal and of a metal oxide reducible by said metal, and applying heat to said mixture to cause the oxidizable metal and said metal oxide to react and thereby evolve heat for fusing the refractory.

KARL HACKS.
WILLIAM S. SPROW.